United States Patent
Kerr et al.

(10) Patent No.: US 8,902,449 B1
(45) Date of Patent: Dec. 2, 2014

(54) SYSTEMS AND METHODS FOR DETERMINING WHEN RESULTS FROM A CRITERIA SCAN ARE DELETED FROM A COMPUTING DEVICE

(75) Inventors: Brian J. Kerr, Pleasant Grove, UT (US); Allen Anderson, South Jordan, UT (US)

(73) Assignee: Crimson Corporation, Dover, DE (US)

( * ) Notice: Subject to any disclaimer, the term of this patent is extended or adjusted under 35 U.S.C. 154(b) by 1391 days.

(21) Appl. No.: 11/619,534

(22) Filed: Jan. 3, 2007

(51) Int. Cl.
*G06F 3/12* (2006.01)

(52) U.S. Cl.
USPC ........... 358/1.15; 358/1.1; 709/229; 709/227; 709/217; 709/218

(58) Field of Classification Search
USPC ........... 358/1.1, 1.15; 709/229, 227, 217, 218
See application file for complete search history.

(56) References Cited

U.S. PATENT DOCUMENTS

| | | | |
|---|---|---|---|
| 6,085,247 A | 7/2000 | Parsons, Jr. et al. | |
| 6,092,196 A | 7/2000 | Reiche | |
| 6,301,012 B1 * | 10/2001 | White et al. | 358/1.15 |
| 6,480,473 B1 | 11/2002 | Chambers et al. | |
| 6,747,977 B1 * | 6/2004 | Smith et al. | 370/395.64 |
| 6,961,762 B1 * | 11/2005 | Yeap et al. | 709/221 |
| 7,080,404 B2 | 7/2006 | Abdo et al. | |
| 7,136,999 B1 | 11/2006 | Griffiths | |
| 7,293,289 B1 * | 11/2007 | Loc et al. | 726/23 |
| 2002/0199116 A1 * | 12/2002 | Hoene et al. | 713/201 |
| 2003/0140049 A1 * | 7/2003 | Radatti | 707/100 |
| 2003/0210697 A1 * | 11/2003 | Mercier | 370/395.1 |
| 2004/0174874 A1 * | 9/2004 | Saito et al. | 370/389 |
| 2005/0198379 A1 * | 9/2005 | Panasyuk et al. | 709/239 |
| 2006/0056408 A1 * | 3/2006 | Cho | 370/389 |

* cited by examiner

*Primary Examiner* — Martin Mushambo
(74) *Attorney, Agent, or Firm* — Austin Rapp & Hardman

(57) ABSTRACT

A method for determining when results from a first criteria scan are deleted from a computing device is described. A first criteria scan is performed on a computing device. Results of the first criteria scan are stored on the computing device. The computing device is disconnected from a first network. An inform packet is broadcast to at least one server. A response is received from the at least one server. The stored results of the first criteria scan are deleted if the computing device determines that the at least one server is not part of the first network.

20 Claims, 8 Drawing Sheets

SYSTEMS AND METHODS FOR DETERMINING WHEN RESULTS FROM A CRITERIA SCAN ARE DELETED FROM A COMPUTING DEVICE

TECHNICAL FIELD

The present invention relates generally to computers and computer-related technology. More specifically, the present invention relates to systems and methods for determining when results from a criteria scan are deleted from a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software or fixing problems with existing systems may cause down-time during which the business or individual operates at a diminished level. Most individuals and businesses try to minimize computer problems so as to avoid down-time.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
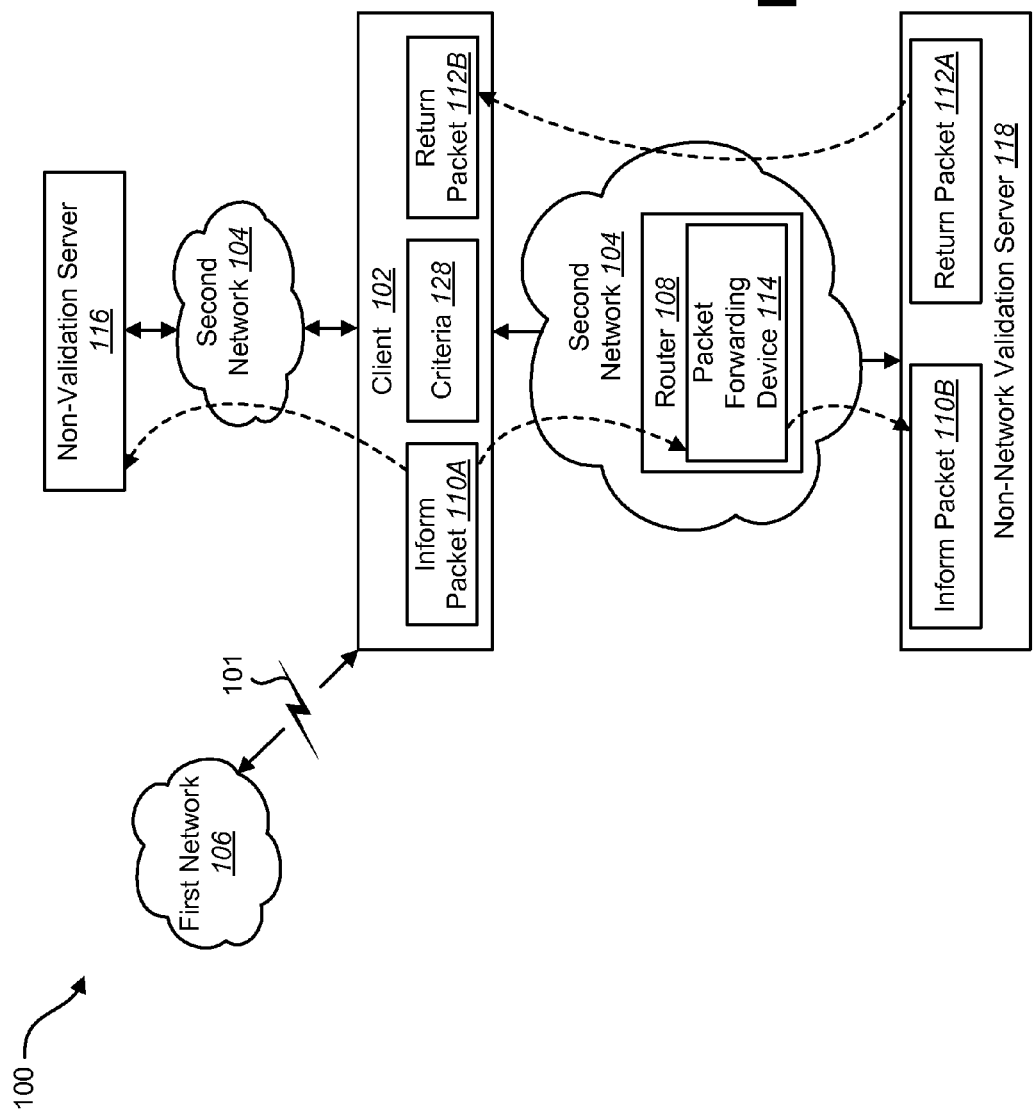
FIG. 1 is a block diagram illustrating one embodiment of a client disconnected from a first network and attempting to connect to a second network.

A method for determining when results from a first criteria scan are deleted from a computing device is described. A first criteria scan is performed on a computing device. Results of the first criteria scan are stored on the computing device. The computing device is disconnected from a first network. An inform packet is broadcast to at least one server. A response is received from the at least one server. The stored results of the first criteria scan are deleted if the computing device determines that the at least one server is not part of the first network.

In one embodiment, the inform packet comprises a Dynamic Host Configuration Protocol (DHCP) packet. The at least one server may comprise a DHCP server. The inform packet may comprise a special option in the upper range and the special option in the upper range may comprise a request for a response to the inform packet.

In one embodiment, the response is digitally signed using a private key associated with the first network. The response may comprise a Media Access Control (MAC) address of the client. The MAC address may be digitally signed with the private key associated with the first network. In one embodiment, the digital signature of the response is verified by the first network, and the stored results of the first criteria scan may be maintained based on the verification.

In a further embodiment, the stored results of the first criteria scan are deleted if a response to the inform packet is not received within a defined time parameter. A second criteria scan may be performed if the results of the first criteria scan are deleted from the computing device. The computing device may be placed on an isolated network. In one embodiment, a plurality of network adapters are monitored for a network address.

A computer system that is configured to determine when results from a first criteria scan are deleted is also described. The computer system includes a processor and memory in electronic communication with the processor. Instructions are stored in the memory. A first criteria scan is performed on the computer system. Results of the first criteria scan are stored on the computer system. The computer system is disconnected from a first network. An inform packet is broadcast to at least one server. A response is received from the at least one server. The stored results of the first criteria scan are deleted if the computer system determines that the at least one server is not part of the first network.

A computer-readable medium comprising executable instructions to determine when results from a first criteria scan are deleted from a computing device is also described. A first criteria scan is performed on a computing device. Results of the first criteria scan are stored on the computing device. The computing device is disconnected from a first network. An inform packet is broadcast to at least one server. A response is received from the at least one server. The stored results of the first criteria scan are deleted if the computing device determines that the at least one server is not part of the first network.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Many businesses and other types of organizations have a number of computers that are used by employees. Some or all of these computers are often interconnected to form a computer network. One or more computer servers may be utilized to control which computers are allowed to join the computer network. The server may verify that a particular computer includes the necessary qualifications to join the network.

Mobile computing devices are often connected to a computer network. These mobile devices may include laptop computers, personal digital assistants (PDA), cellular telephones, etc. The mobility characteristic allows these devices to disconnect from a first network and connect to a second network in a different location. The device may disconnect from the second network and connect to a third network and so on. For example, an employee of an organization may attempt to connect a laptop computer to the organization's network. A server connected to the organization's network may validate the laptop computer before allowing the laptop to connect to the network. The employee may subsequently disconnect the laptop from the network and connect the laptop to some other network, for instance a network at the employee's place of residence.

Often times, a computing device may attempt to reconnect to a network that the device was previously connected to. For example, an employee may desire to reconnect a laptop computer to an organization's network after having disconnected the laptop from such network. A computing device may become infected after disconnecting from a network. For example, a computer may receive a harmful element, such as a computer virus or worm, after disconnecting from the network and connecting to a different network. As such, a server may be required to revalidate the computing device before allowing the device to reconnect back to the network. If an infected computer were allowed to reconnect to the network, the harmful element on the computer may infect other computers connected to the network.

Network servers may possess limited computing capabilities. As such, the computing capabilities associated with network servers are in high demand from the computing devices connected to the computer network. Requiring the server to revalidate each computer that attempts to reconnect to the network may not be an efficient utilization of the server's computing capabilities. Accordingly, benefits may be realized by improved systems and methods for reconnecting a computing device to a network.

FIG. 1 is a block diagram 100 illustrating one embodiment of a client 102 that is disconnected 101 from a first network 106. The client 102 may desire to connect to a second network 104. The client 102 may include any type of computing device such as a laptop computer, personal computer, personal digital assistant (PDA), cellular telephone, etc. The first network 106 may include a first corporate network within a corporation or organization. In one embodiment, the first network 106 is a secure network which serves to validate computing devices before allowing them access to connect to the network. In order for the client 102 to connect to the first network 106, the client 102 may be required to possess certain criteria requirements. The criteria requirements may be determined by a system administrator. Examples of criteria requirements may include installation of virus scanner, virus scanner run within x days, virus definition up to date, security packets installed, critical patches applied, secure passwords, etc. The client 102 may perform a first criteria scan in which the client 102 may scan itself for the necessary criteria and store criteria results 128 locally. If the client 102 possesses the necessary criteria, the client 102 may be validated and allowed to connect to the first network 106.

When the client 102 disconnects 101 from the first network 106, the most recent results of a criteria scan may continue to be stored on the client 102, such as the criteria results 128 from the first criteria scan. If the client 102 attempts to reconnect to the first network 106, the stored criteria results 128 may be reused to revalidate the client 102. Using the stored criteria results 128 eliminates the need for the client 102 to perform a second criteria scan.

In a further embodiment, the criteria results 128 are deleted when the client 102 connects to the second network 104. The second network 104 may include a second corporate network that may be distinct and separate from the first corporate network included in the first network 106. In a further embodiment, the second network 104 includes any other type of network, such as a personal home network, a school network, a public network (library, airport, etc.) and the like. When the client 102 attempts to reconnect to the first network 106, the client 102 may be unable to revalidate itself using the stored criteria results 128 because the results 128 may have been deleted from the client 102. In one embodiment, the client 102 may be required to perform a second criteria scan by rescanning itself for the necessary criteria before being allowed to reconnect to the first network 106.

When the client 102 disconnects 101 from the first network 106, the client 102 may connect to a non-validation server 116 or a non-network validation server 118 over the second network 104. The non-validation server 116 and the non-network validation server 118 may include Dynamic Host Configuration Protocol (DHCP) which is a protocol used when computing devices are added to a network.

In one embodiment, the client 102 may include an inform packet 110A which may be a DHCP inform packet. The inform packet 110A may include a request for a response from any server connected to the second network 104. In a further embodiment, the inform packet 110A may include a request for any server to validate the client 102 so the client 102 may be granted access to connect to the second network 104. The inform packet 110A may include a special option in the upper range indicating a request for a response from any server. The inform packet 110A may be used to request a response from the non-validation server 116 or the non-network validation server 118.

The non-network validation server 118 may include the ability to validate clients that wish to connect to the second network 104. In one embodiment, the non-network validation server 118 may be a DHCP corporate server. The second network 104 may include a router 108 which includes a packet forwarding device 114. The forwarding device 114 may be used to receive the inform packet 110A from the client 102 and forward the packet 110A to the non-network validation server 118. The non-network validation server 118 may receive the inform packet 110B, and respond to the request by sending a return packet 112A to the client 102. The non-network validation server 118 sends the return packet 112A because the server 118 may possess the ability to validate clients. The client 102 receives the return packet 112B from the server 118. The client 102 may delete the criteria results 128 obtained from the first criteria scan because the return packet 112B was not sent from a server connected to the first network 106. If the client 102 subsequently attempts to reconnect to the first network 106, the client 102 may be required to perform a second criteria scan.

In one embodiment, the inform packet 110A may also be sent to the non-validation server 116. In one embodiment, the non-validation server 116 may not possess the ability to validate clients. For example, the non-validation server 116 may be connected to a network which does not require validation of the client 102 before allowing the client 102 access to the network. Some examples of these networks may include the network at an Internet Café or a network at a public location (library, airport, etc.). The server 116 may not respond to the request included in the inform packet 110A because the server 116 may not validate clients before allowing them access to the network. The request included in the inform packet 110A may pertain to a special option in the upper range of the packet 110A which requests a response. In one embodiment, DHCP includes a framework for passing configuration information to hosts on a TCP/IP network. Configuration parameters and other control information may be carried in tagged data items that are stored in an options field of the DHCP message. The data items themselves may also be referred to as special options. Special options may be fixed length or variable length. The special option in the upper range may be unused options by the non-validation server 116. The non-validation server 116 may ignore the inform packet 110A and not send a return packet to the client 102. If the client 102 does not receive a return packet within a certain time parameter after sending the inform packet 110A, the client 102 may delete the criteria results 128. If the client 102 subsequently attempts to reconnect to the first network 106, the client 102 may be required to perform a second criteria scan before being allowed access to connect to the first network 106.

Figure 2:
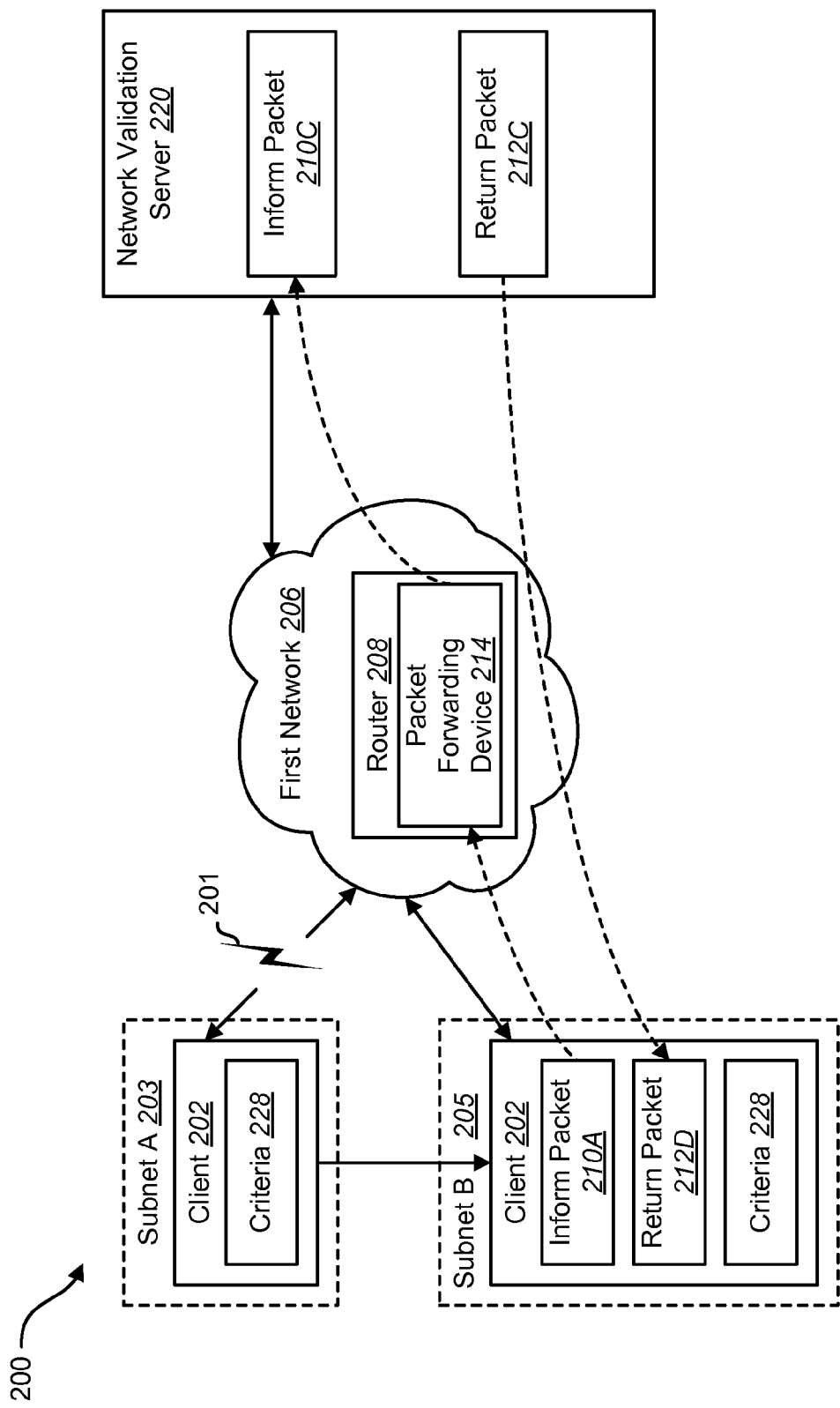
FIG. 2 is a block diagram illustrating one embodiment of the client reconnecting to the first network from a subnet of the first network.

FIG. 2 is an embodiment 200 of the client 202 attempting to reconnect to the first network 206. The client 202 may connect to the first network 206 from subnet A 203. The client 202 may perform a first criteria scan and scan itself for the necessary criteria. The client 102 may then store the criteria scan results 228 locally. After connecting to the first network 206, the client 202 may then disconnect 201 from the first network 206 while the client 202 is in subnet A 203. The client 202 may move to subnet B 205 and attempt to reconnect to the first network 206. In one embodiment, subnet A 203 and subnet B 205 are subnets of the first network 206. If the criteria results 228 from the first criteria scan are still stored on the client 202, the client 202 may provide the stored results 228 to a validating server on the first network 206. In one embodiment, providing the stored results 228 eliminates the need for the client 202 to perform a second criteria scan and rescan itself for the criteria.

When the client 202 moves to subnet B 205 and attempts to reconnect to the first network 206, the client 202 may send the inform packet 210A to a server connected to the first network 206. The first network 206 may include a router 208 which includes a packet forwarding device 214. The client 202 may send the packet 210A to the forwarding device 214 which may then forward the inform packet 210C to a network validation server 220. The network validation server 220 may possess the ability to validate clients and may include a DHCP server. The network validation server 220 may receive the inform packet 210C, and send a return packet 212C to the client 202. In one embodiment, the return packet 212C is a DHCP inform packet. Because the return packet 212C is sent from a server connected to the first network 206, the client may maintain the criteria results 228 from the first criteria scan and reuse these results 228 to reconnect to the first network 206. Because the criteria results 228 may be reused in this context, the client 202 does not need to perform another criteria scan. The client 202 may then provide the stored results 228 to the server 220 in order to be validated and reconnected with the first network 206.

Figure 3:
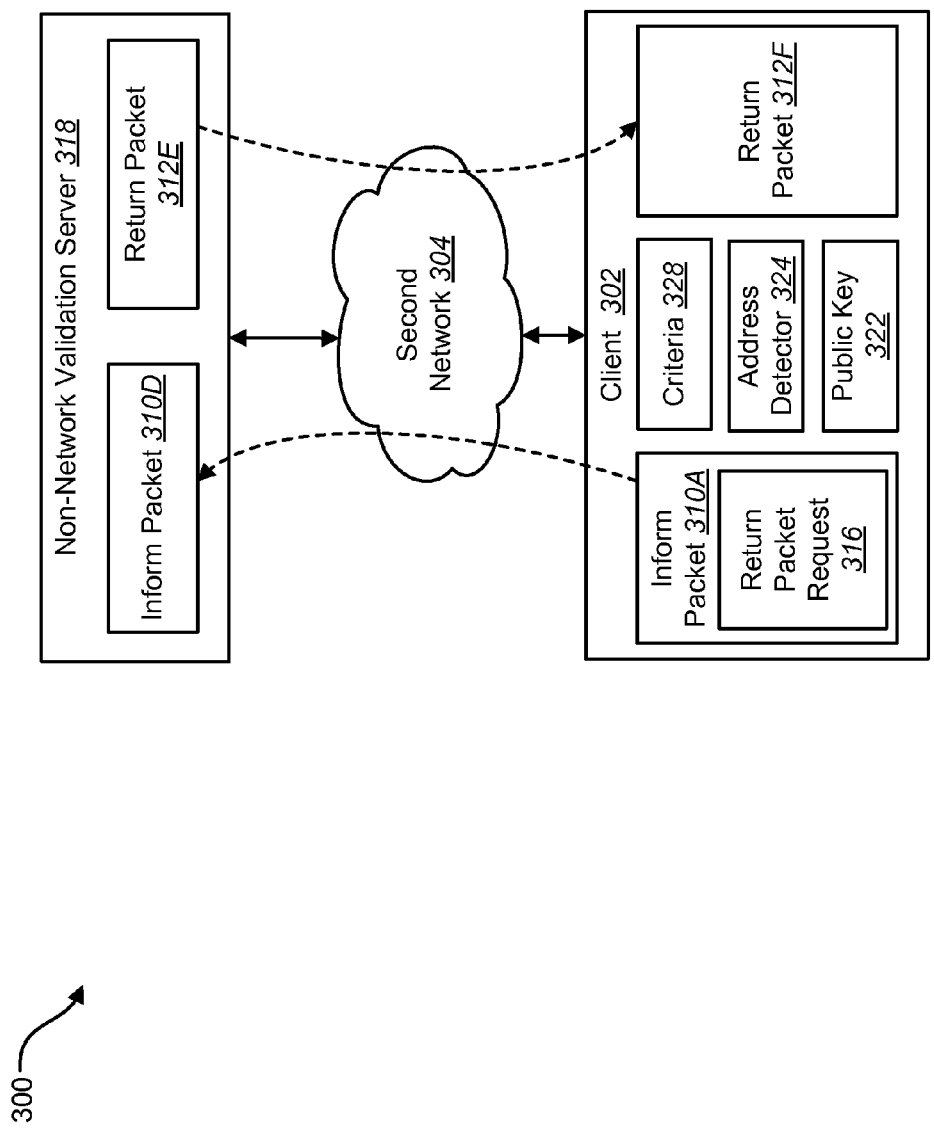
FIG. 3 is a block diagram illustrating another embodiment of the client connecting to the second network.

FIG. 3 is a block diagram 300 illustrating a further embodiment of the client 302 and the non-network validation server 318. In one embodiment, the client 302 disconnects from the first network (not shown) and the client 302 attempts to connect to the second network 304. The client 302 may include stored criteria 328 which include the results of the last criteria scan performed by the client 302. In one embodiment, the client 302 may have performed the last criteria scan in order to connect to the first network 106. The client 302 may also include an address detector 324. The address detector 324 may monitor network adapters of the client 302. In one embodiment, the network adapters indicate the presence of a network by providing the address of the network. For example, after the client 302 disconnects from the first network 106, the network adapters may not include a network address until the client 302 attempts to reconnect to the first network 106 or attempts to connect to a different network, such as the second network 304. In one embodiment, the network address may be a gateway address associated with a network.

The client 302 may send the inform packet 310A to the non-network validation server 318 when the address detector 324 detects a network address at the network adapters. The inform packet 310A may include a return packet request 316. The return packet request 316 may include a special option in the upper range which indicates a request for a response from the server 318 for validation to connect to the network 106. The non-network validation server 318 may receive the inform packet 310D from the client 302. The non-network validation server 318 may include a return packet 312E which may serve as a response to the return packet request 316. In one embodiment, the return packet 312E is a DHCP return packet. In a further embodiment, the return packet 312E is a DHCP inform packet.

The return packet 312E may be sent using public-key cryptography. Public-key cryptography serves to allow a client and a server to communicate securely without having prior access to a shared secret key. The client may utilize a public key to verify if a signed return packet was sent from a server on the first network 106. The return packet 312E is signed with a second network private key which may be the private key associated with the second network 304. The non-network validation server 318 may place a Media Access Control (MAC) address of the client 302 in an upper range option of the return packet 312E. In one embodiment, the MAC address included in the return packet 312E is signed with second network private key. The signature included with the return packet 312E may be verified using a public key, such as the second network public key.

The client 302 may receive the return packet 312F from the non-network validation server 318. The client 302 may include a first network public key 322. The first network public key 322 may be the public key associated with the first network 106. Servers connected on the first network 106 may digitally sign data using a private key associated with the first network 106. In contrast, the first network public key 322 may be unable to verify that the return packet 312F was sent from a server on the first network 106 because it is signed using the private key associated with the second network 304. The inability to verify the signature of the return packet 312F may indicate to the client 302 that the return packet 312F was not sent from a server on the first network 106. In one embodiment, the client 302 deletes the criteria results 328. Because the criteria results 328 are deleted, the client 302 is required to perform a second criteria scan when the client 302 attempts to reconnect to the first network 106.

Figure 4:
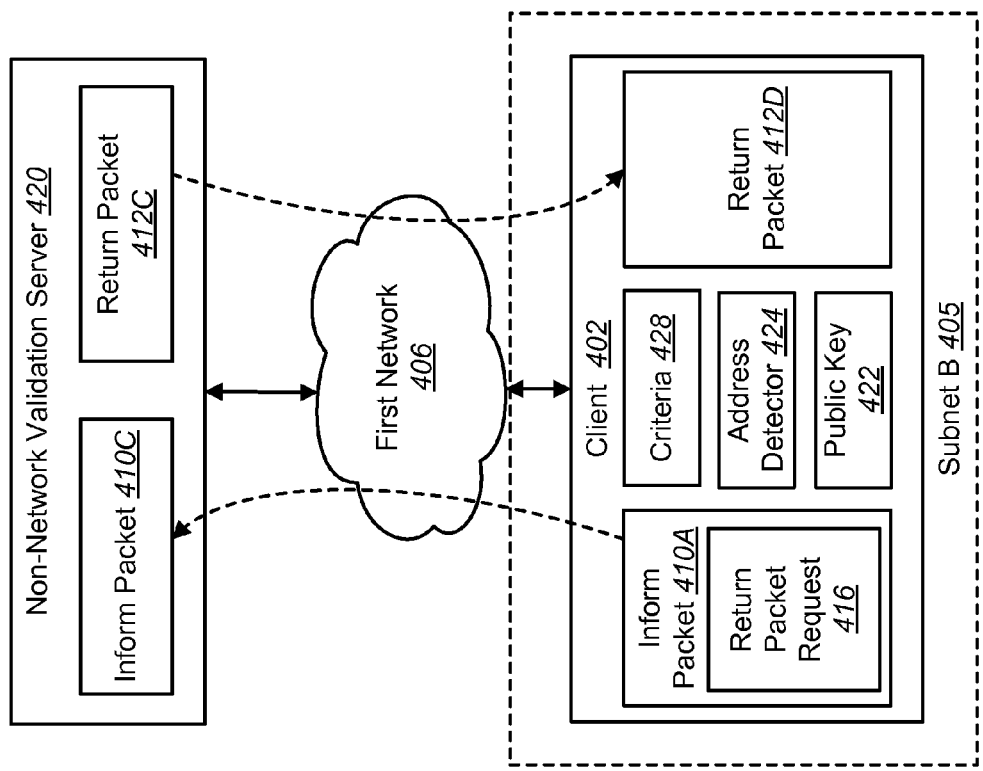
FIG. 4 is a block diagram illustrating another embodiment of the client reconnecting to the first network.

FIG. 4 is a block diagram 400 illustrating a further embodiment of the client 402 and the network validation server 420. The client 402 may have disconnected from the first network 406 while in subnet A (not shown). In the illustrated block diagram 400, the client 402 may move to subnet B 405 and attempt to reconnect to the first network 406. The client 402 includes the criteria results 428. The results 428 may represent the most recent results of a criteria scan of the client 402. For example, the client 402 may have performed a first criteria scan when the client 402 connected to the first network 406 while in subnet A.

The address detector 424 monitors the network adapters of the client 402. The address detector 424 may detect the network address of the first network 406 at the network adapters. The client 402 may send the inform packet 410A with the return packet response 416. In one embodiment, the client 402 sends the inform packet 410A to the network validation server 420. The network validation server 420 may receive the inform packet 410C from the client 402. The network validation server 420 may respond to the inform packet 410C by sending the return packet 412C. In one embodiment, the return packet 412C includes the MAC address of the client 402 in an upper range option of the packet 412C.

The return packet 412C sent from the network validation server 420 may be digitally signed with the first network private key. In one embodiment, the network validation server 420 may sign the MAC address using a first network private key. The signature included with the return packet 412C may be verified with a public key 422 associated with the first network 406. The client may receive the return packet 412D and successfully verify the signature of the packet 412D using the first network public key. In one embodiment, the client 402 does not delete the criteria results 428 because the client 402 is aware that the return packet 412D was sent from a server connected to the first network 406. The client 402 may utilize the stored criteria results 428 to be revalidated when reconnecting to the first network 406 from subnet B 405. Reusing the stored criteria results 428 eliminates the need for the client 402 to perform a second criteria scan.

Figure 5:
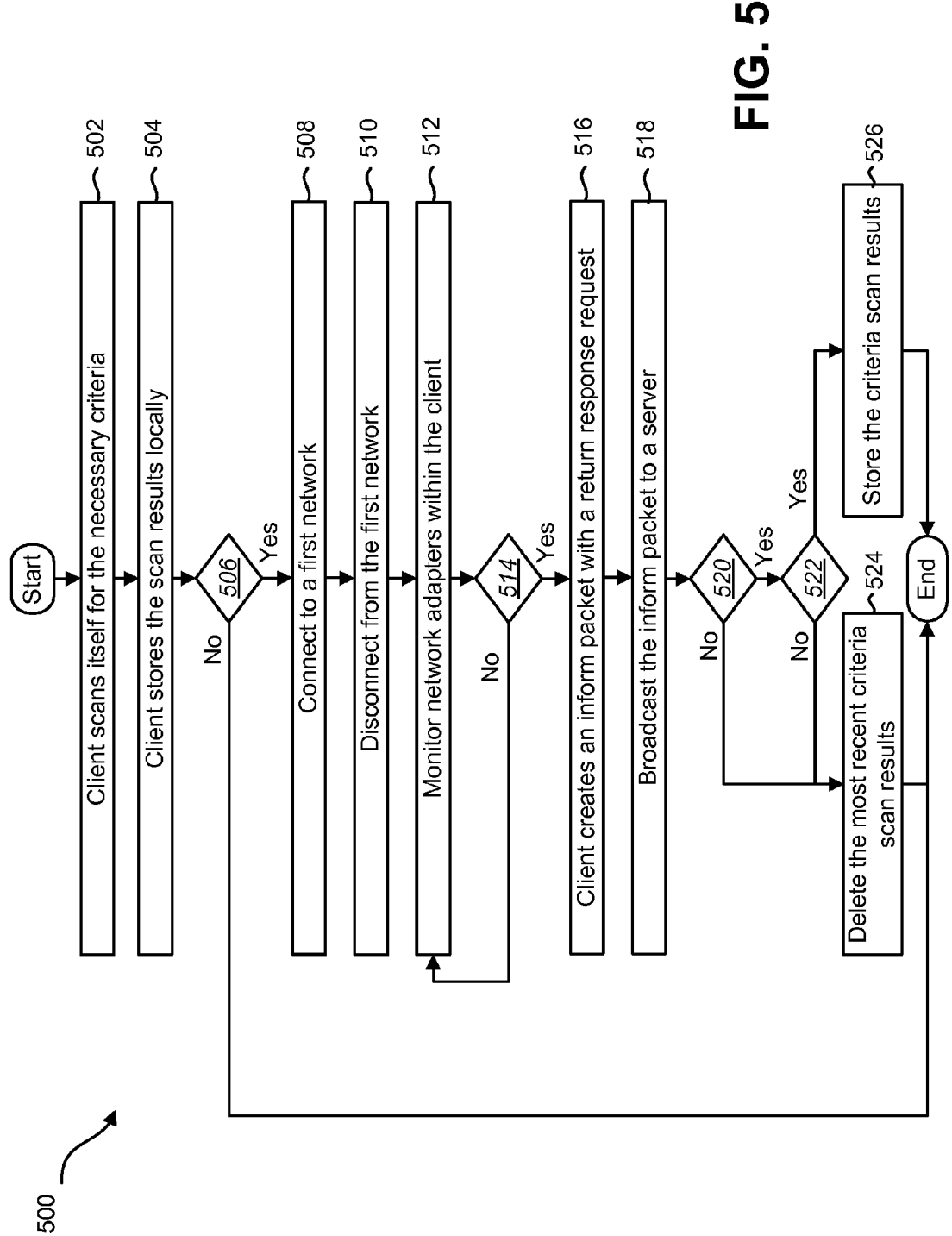
FIG. 5 is a flow diagram illustrating a method for determining whether results from a criteria scan may continue to be stored on the client.

FIG. 5 is a flow diagram illustrating one embodiment of a method 500 to indicate if a client 102 may delete the criteria results 128 from the most recent criteria scan. The method 500 begins and the client 102 may desire to connect to the first network 106. In one embodiment, the client 102 may be required to possess certain criteria in order to connect to the first network 106. A first criteria scan may be performed and the client 102 may scan 502 itself for the necessary criteria. The results of the first criteria scan may be stored 504 locally on the client 102. If a server on the first network 106 determines 506 that the client 102 does not possess the necessary criteria, the method 500 ends. If the client 102 does 506 possess the necessary criteria, the client 102 is permitted to connect 508 to the first network 106.

At a later time, and for whatever reason, the client 102 may disconnect 510 from the first network 106. The client 102 may monitor 512 network adapters for a network address. In one embodiment, the address detector 324 may monitor 512 the network adapters. If the address detector 324 does not detect 514 a network address at a network adapter, the address detector 324 continues to monitor 512 the network adapters. If the address detector 324 detects 514 a network address, the inform packet 110 is created 516. The inform packet 110 may include the return response request 316. The client 102 may broadcast 518 the inform packet 110. In one embodiment, the client 102 broadcasts 518 the inform packet 110 to any server connected on the network associated with the network address detected 514 by the address detector 324.

The client 102 determines 520 if a return packet 112 is received. If the return packet 112 is not received 520 within a certain time after the inform packet 110 was broadcast, the client 102 deletes 524 the criteria results 128 from the most recent criteria scan of the client 102. If the return packet 112 is received 520 within the time parameter, the client 102 validates the return packet 112. In one embodiment, the return packet 112 may be signed with a private key. In a further embodiment, the return packet 112 includes the MAC address of the client 102 and the MAC address is signed with the private key. The client 102 may validate the packet 112 by verifying the signature of the MAC address using a public key. If the packet 112 is verified 522, the client 102 continues to store 526 the criteria results 128 from the most recent criteria scan. However, if the packet 112 is not verified 522 with the public key, the client 102 deletes 524 the criteria results 128.

Figure 6:
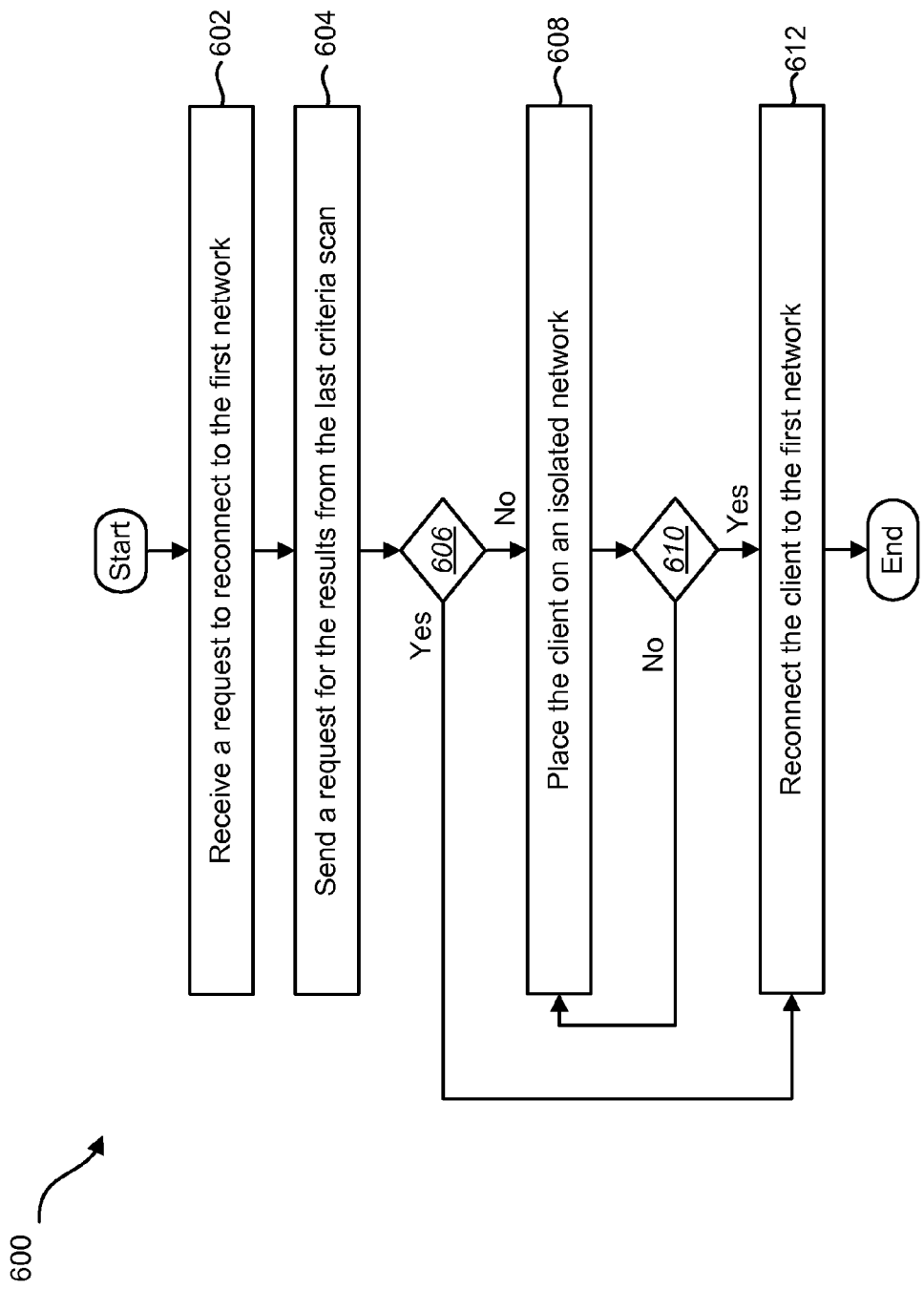
FIG. 6 is a flow diagram illustrating a method for determining whether the client may reconnect to the first network.

FIG. 6 is a flow diagram illustrating a reconnect method 600. The method 600 may be used to determine whether or not the client 102 is allowed to reconnect to the first network 106. In one embodiment, the method 600 may be implemented by the network validation server 220. The method 600 begins and the server 220 receives 602 a reconnect request from the client 102. The reconnect request may include a request by the client 102 to reconnect to the first network 106. The server 220 may send 604 a request to the client 102 for the results from the most recent criteria scan. The client 102 may utilize the stored results of the most recent criteria scan if these results have not been deleted as explained in reference to FIG. 5. If the client 102 still possesses 606 the stored results 128, the client 102 may reuse the stored results 128 by sending them to the server 220. The client 102 may be allowed to reconnect to the first network 106 and the method 600 ends. However, if the client 102 does not possess 606 the criteria results 128 from the most recent scan, the client 102 may be placed 608 on an isolated network. The isolated network is not part of the first network 106 and isolates the client 102 from the first network and computing devices on the first network 106. In one embodiment, the client 102 is placed 608 on an isolated virtual local area network (VLAN) where the client 102 performs a second criteria scan.

The server 220 determines 610 if the client 102 has provided results from the second criteria scan. In one embodiment, the client 102 rescans itself for the necessary criteria because the results from the first criteria scan were deleted from the client 102. If the client 102 rescans itself and provides 610 the results of the second scan to the server 220, the client 102 may be allowed to reconnect 612 to the first network 106. However, if the client 102 does not 610 rescan itself and provide the results to the sever 220, the client 102 may be maintained on the isolated network.

Figure 7:
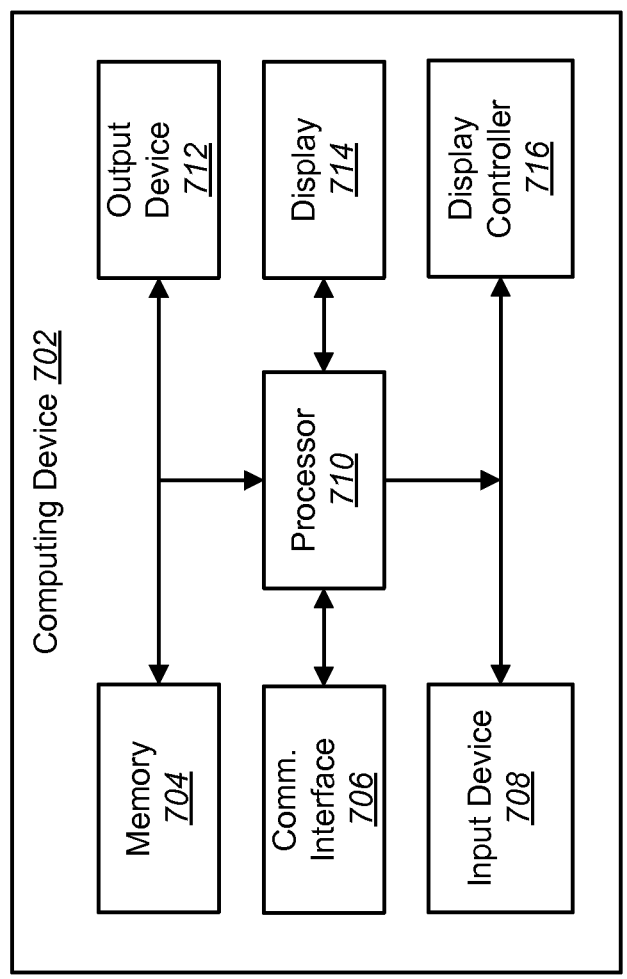
FIG. 7 is a block diagram illustrating the major hardware components typically utilized in a computing device.

FIG. 7 illustrates various components that may be utilized in a computing device 702 that may be used as a server and/or a client. The illustrated components may be located within the same physical structure or in separate housings or structures.

The computing device 702 includes a processor 710 and memory 704. The processor 710 controls the operation of the computing device 702 and may be embodied as a microprocessor, a microcontroller, a digital signal processor (DSP) or other device known in the art. The processor 710 typically performs logical and arithmetic operations based on program instructions stored within the memory 704.

The computing device 702 typically also includes one or more communication interfaces 706 for communicating with other electronic devices. The communication interfaces 706 may be based on wired communication technology, wireless communication technology, or both. Examples of different types of communication interfaces 706 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 702 typically also includes one or more input devices 708 and one or more output devices 712. Examples of different kinds of input devices 708 include a keyboard, mouse, microphone, remote control device, button, joystick, trackball, touchpad, lightpen, etc. Examples of different kinds of output devices 712 include a speaker, printer, etc. One specific type of output device which is typically included in a computer system is a display device 714. Display devices 714 used with embodiments disclosed herein may utilize any suitable image projection technology, such as a cathode ray tube (CRT), liquid crystal display (LCD), light-emitting diode (LED), gas plasma, electroluminescence, or the like. A display controller 716 may also be provided, for converting data stored in the memory 704 into text, graphics, and/or moving images (as appropriate) shown on the display device 714.

Figure 8:
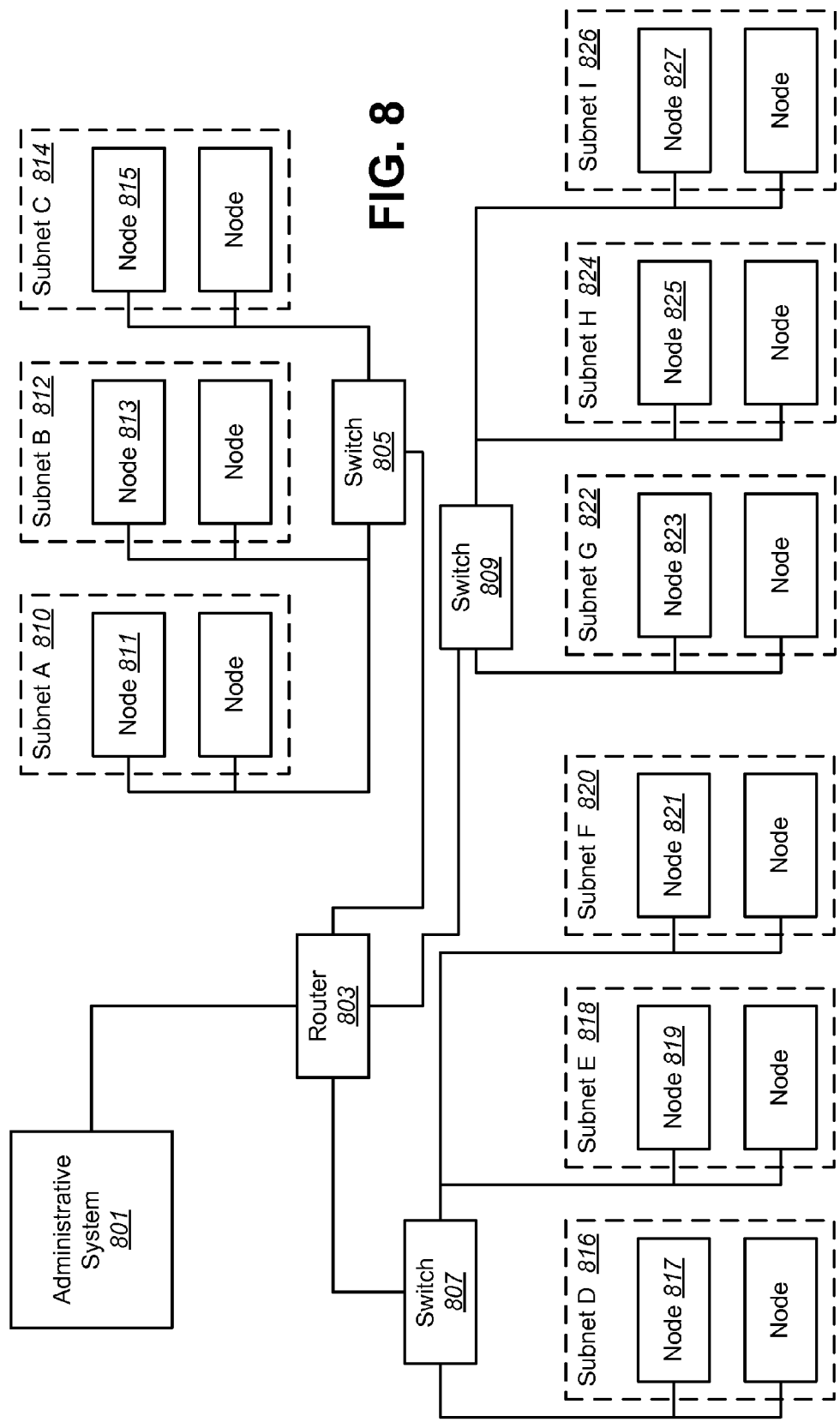
FIG. 8 is a block diagram illustrating a computer network on which the present systems and methods may be implemented.

FIG. 8 is an exemplary block diagram illustrating a computer network on which the present systems and methods may be implemented. In FIG. 8, an administrative system 801 connects to a router 803. The administrative system 801, or administrative node 801, may be any computer or computing device that has been configured to, or is being used for, receiving notifications from one or more monitors.

The router 803 may be connected to three switches: a first switch 805, a second switch 807 and a third switch 809. Each switch 805, 807, and 809 connects to three subnets. The first switch 805 connects to three subnets 810, 812, and 814. The second switch 807 connects to three subnets 816, 818, and 820. The third switch 809 connects to three subnets 822, 824, and 826. A network group may be embodied in a wide variety of configurations and may include a local area network, a subnet 810, 812, and 814, or a group of subnets 810, 812, and 814. The network nodes or elements 811, 813, 815, 817, 819, 821, 823, 825 and 827 represent computer systems or devices on the computer network. One or more of the nodes may use embodiments of the systems and methods described herein. The network may include both wired and wireless connections to nodes or elements 811, 813, 815, 817, 819, 821, 823, 825 and 827 within the network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for determining when results from a first criteria scan are deleted from a computing device, the method comprising:
    performing the first criteria scan on the computing device, wherein the first criteria scan determines a status of a virus scanner and critical patches on the computing device;
    storing results of the first criteria scan on the computing device, wherein the stored results of the first criteria scan comprise the status of the virus scanner, and the critical patches on the computing device;
    disconnecting the computing device from a first network;
    broadcasting an inform packet to at least one server; and
    if a response to the inform packet is received within a defined time parameter, deleting the stored results of the first criteria scan in their entirety if the computing device determines that the at least one server is not part of the first network such that the computing device is required to perform a second criteria scan before the computing device is allowed to reconnect to the first network.

2. The method of claim 1, wherein the inform packet comprises a Dynamic Host Configuration Protocol (DHCP) packet.

3. The method of claim 1, wherein the at least one server comprises a DHCP server.

4. The method of claim 1, wherein the inform packet comprises a special option in an upper range.

5. The method of claim 4, wherein the special option in the upper range comprises a request for a response to the inform packet.

6. The method of claim 1, wherein the response is digitally signed using a private key associated with the first network.

7. The method of claim 1, wherein the response comprises a Media Access Control (MAC) address of the computing device.

8. The method of claim 7, wherein the MAC address is digitally signed with a private key associated with the first network.

9. The method of claim 6, further comprising verifying a digital signature of the response by the first network, and maintaining the stored results of the first criteria scan based on the verification.

10. The method of claim 1, further comprising:
    if the response to the inform packet is not received within the defined time parameter, deleting the stored results of the first criteria scan.

11. The method of claim 1, further comprising performing the second criteria scan if the results of the first criteria scan are deleted from the computing device.

12. The method of claim 11, further comprising placing the computing device on a network that is not part of the first network.

13. The method of claim 1, further comprising monitoring a plurality of network adapters for a network address.

14. A computer system that is configured to determine when results from a first criteria scan are deleted, the computer system comprising:
    a processor;
    memory in electronic communication with the processor;
    instructions stored in the memory, the instructions being executable to:
    perform the first criteria scan on the computer system, wherein the first criteria scan determines a status of a virus scanner and critical patches on the computer system;
    store results of the first criteria scan on the computer system, wherein the stored results of the first criteria scan comprise the status of the virus scanner and the critical patches on the computer system; disconnect the computer system from a first network; broadcast an inform packet to at least one server; and
    if a response to the inform packet is received within a defined time parameter, delete the stored results of the first criteria scan in their entirety if the computer system determines that the at least one server is not part of the first network such that the computer system is required to perform a second criteria scan before the computer system is allowed to reconnect to the first network.

15. The computer system of claim 14, wherein the inform packet comprises a Dynamic Host Configuration Protocol (DHCP) packet.

16. The computer system of claim 14, wherein the server comprises a DHCP server.

17. The computer system of claim 14, wherein the response is digitally signed with a private key associated with the first network.

18. A non-transitory computer-readable medium comprising executable instructions to determine when results from a first criteria scan are deleted from a computing device, the instructions being executable to:
    perform the first criteria scan on the computing device, wherein the first criteria scan determines a status of a virus scanner and critical patches on the computing device;
    store results of the first criteria scan on the computing device, wherein the stored results of the first criteria scan comprise the status of the virus scanner and the critical patches on the computing device; disconnect the computing device from a first network; broadcast an inform packet to at least one server; and
    if a response to the inform packet is received within a defined time parameter, delete the stored results of the first criteria scan in their entirety if the computing device determines that the at least one server is not part of the first network such that the computing device is required to perform a second criteria scan before the computing device is allowed to reconnect to the first network.

19. The non-transitory computer-readable medium of claim 18, wherein the inform packet comprises a Dynamic Host Configuration Protocol (DHCP) packet.

20. The non-transitory computer-readable medium of claim 18, wherein the server comprises a DHCP server.

* * * * *